(12) United States Patent
Agapiou et al.

(10) Patent No.: US 12,126,225 B2
(45) Date of Patent: Oct. 22, 2024

(54) OPTICAL INSPECTION OF STATOR SLOTS

(71) Applicant: GM GLOBAL TECHNOLOGY OPERATIONS LLC, Detroit, MI (US)

(72) Inventors: John S. Agapiou, Rochester Hills, MI (US); Sean Robert Wagner, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 330 days.

(21) Appl. No.: 17/690,926

(22) Filed: Mar. 9, 2022

(65) Prior Publication Data
US 2023/0291284 A1    Sep. 14, 2023

(51) Int. Cl.
*H02K 11/20* (2016.01)
*G01N 21/88* (2006.01)
*G06T 7/00* (2017.01)

(52) U.S. Cl.
CPC ......... *H02K 11/20* (2016.01); *G01N 21/8851* (2013.01); *G06T 7/001* (2013.01); *G06T 2207/30164* (2013.01)

(58) Field of Classification Search
CPC .......... H02K 11/20; H02K 15/00; H02K 3/12; G01N 21/8851; G01N 21/95; G06T 7/001; G06T 2207/30164; G06T 2207/10016; G06T 7/0006
See application file for complete search history.

(56) References Cited

U.S. PATENT DOCUMENTS

| | | | |
|---|---|---|---|
| 2009/0027522 A1* | 1/2009 | May | H04N 23/56 348/E5.076 |
| 2019/0257764 A1* | 8/2019 | Ten | G06T 7/0004 |
| 2022/0101515 A1* | 3/2022 | Samata | G06T 7/001 |
| 2022/0206071 A1* | 6/2022 | Hana | G01N 21/9515 |

* cited by examiner

*Primary Examiner* — Akm Zakaria
(74) *Attorney, Agent, or Firm* — CANTOR COLBURN LLP

(57) ABSTRACT

A method of inspecting a stator stack includes disposing the stator stack on a support surface of an inspection system, and performing a depth measurement of a stator slot. The depth measurement includes rotating the stator slot along a first direction to a plurality of first orientations, taking a first image at each of the first orientations, and measuring a depth based on at least one of the first images. The method includes performing a width measurement of the stator slot, which includes rotating the stator slot along a second direction to a plurality of second orientations, taking a second image at each of the second orientations, and measuring a width based on at least one of the second images. The method further includes inspecting edges of the stator slot in the at least one of the first images to detect a potential deviation.

20 Claims, 14 Drawing Sheets

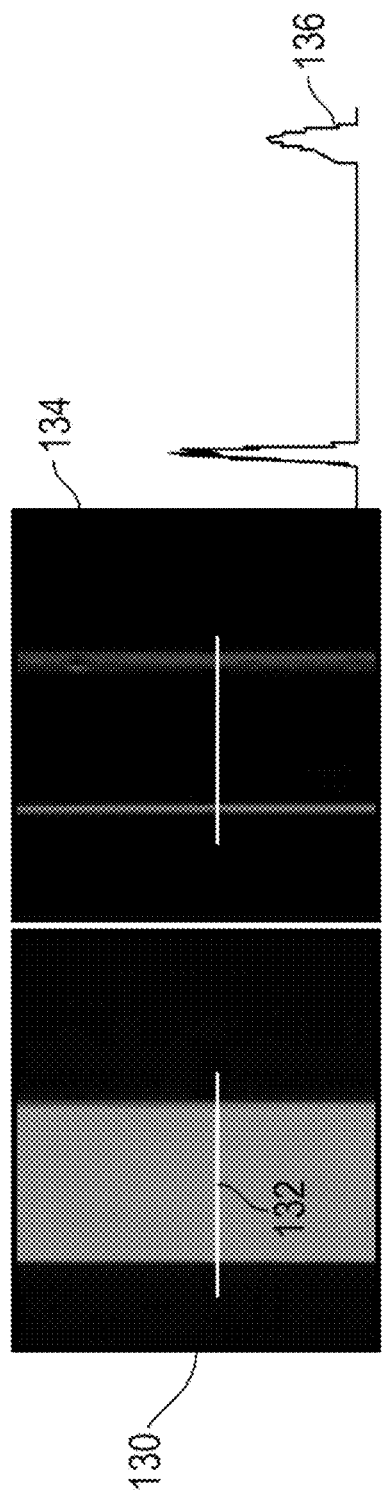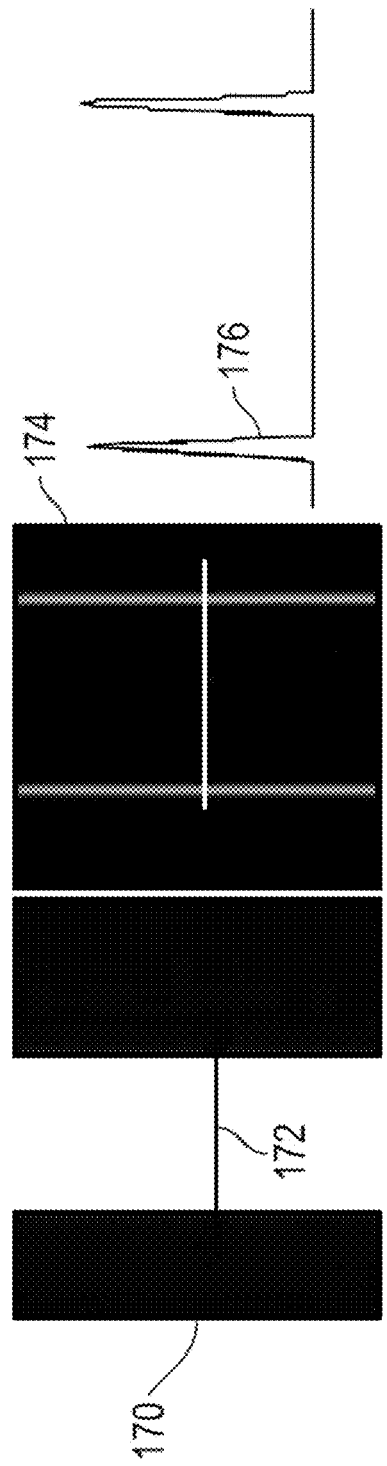

OPTICAL INSPECTION OF STATOR SLOTS

INTRODUCTION

The subject disclosure relates to inspection of electric motor stators, and more particularly to optical inspection of stator slots.

Electric motors are used in a variety of contexts and industries. Electric motors are utilized in the automotive industry, for example, as part of electric and hybrid vehicles. During manufacturing processes, electric motor components are typically inspected to identify defects that could compromise the effectiveness of the finished motors. For example, stators making up part of a motor are constructed from individual laminations that make up a lamination stack. Defects can arise during construction, examples of which include burrs and geometric variations due to misalignment of laminations. It is desirable to have a system and method for inspection of stators during and/or after construction in order to identify and address any defects that could arise.

SUMMARY

In one exemplary embodiment, a method of inspecting a stator stack includes disposing the stator stack on a support surface of an inspection system and locating a stator slot in a field of view of an imaging device, the imaging device having an imaging axis that is aligned relative to a surface of the stator stack, the inspection system including the imaging device and a tilting system configured to control an orientation of the stator slot relative to the imaging axis. The method also includes performing a depth measurement of the stator slot. The depth measurement includes rotating the stator slot along a first direction to a plurality of first orientations, taking a first image at each of the first orientations, and measuring a depth based on at least one of the first images. The method further includes performing a width measurement of the stator slot. The width measurement includes rotating the stator slot along a second direction to a plurality of second orientations, taking a second image at each of the second orientations, and measuring a width based on at least one of the second images, where the first direction is perpendicular to the second direction. The method further includes inspecting edges of the stator slot in the at least one of the first images to detect a potential deviation.

In addition to one or more of the features described herein, the imaging device includes an optical camera and a telecentric lens, the camera configured to take images from a location above the stator slot, and an illumination device configured to apply the illumination from a location below the stator slot.

In addition to one or more of the features described herein, the inspection system includes an illuminator configured to apply illumination through the stator slot, and performing the depth measurement includes analyzing each first image to determine an amount of illumination through the stator slot, selecting a first image having a greatest amount of illumination, and measuring the depth based on the selected first image.

In addition to one or more of the features described herein, the inspection system includes an illuminator configured to apply illumination through the stator slot, and performing the width measurement includes analyzing each second image to determine an amount of illumination through the stator slot, selecting a second image having a greatest amount of illumination, and measuring the width based on the selected second image.

In addition to one or more of the features described herein, the tilting system includes a pivot, a first lift platform and a second lift platform configured to be linearly moved in a direction that is normal to the support surface, the first lift platform is configured to tilt the stator stack along the first direction, and the second lift platform is configured to tilt the stator stack along the second direction.

In addition to one or more of the features described herein, the tilting system includes a base structure supported by the pivot, the first lift platform and the second lift platform, the first lift platform and the second lift platform disposed orthogonally with respect to a location of the pivot.

In addition to one or more of the features described herein, rotating the stator slot along the first direction includes incrementing the first lift platform when the second lift platform is at a default position, and rotating the stator slot along the second direction includes incrementing the second lift platform when the first lift platform is at a default position.

In addition to one or more of the features described herein, the edges of the stator slot include a first long edge and a second long edge opposing the first long edge, and inspecting the edges includes constructing a first best fit line for the first long edge, comparing a first contour of the first long edge to the first best fit line, and identifying a deviation based on a distance between the first best fit line and the first contour being greater than a selected distance threshold. Inspecting the edges also includes constructing a second best fit line for the second long edge, comparing a second contour of the second long edge to the second best fit line, and identifying a deviation based on a distance between the second best fit line and the second contour being greater than a selected distance threshold.

In one exemplary embodiment, a system for inspecting a stator stack includes an inspection system including an imaging device having an imaging axis that is aligned relative to a support surface, a tilting system configured to control an orientation of the stator stack and a stator slot relative to the imaging axis, and a processing device configured to control the imaging device to take images of the stator slot when disposed on the support surface. The processing device is configured to perform a depth measurement of the stator slot. The depth measurement includes rotating the stator slot along a first direction to a plurality of first orientations, taking a first image at each of the first orientations, and measuring a depth based on at least one of the first images. The processing device is also configured to perform a width measurement of the stator slot. The width measurement includes rotating the stator slot along a second direction to a plurality of second orientations, taking a second image at each of the second orientations, and measuring a width based on at least one of the second images, wherein the first direction is perpendicular to the second direction. The processing device is further configured to inspect edges of the stator slot in the at least one of the first images to detect a potential deviation.

In addition to one or more of the features described herein, the inspection system includes an illuminator configured to apply illumination through the stator slot, and the processing device is configured to analyze each first image to determine an amount of illumination through the stator slot, select a first image having a greatest amount of illumination, and measure the depth based on the selected first image.

In addition to one or more of the features described herein, the inspection system includes an illuminator configured to apply illumination through the stator slot, and the processing device is configured to analyze each second image to determine an amount of illumination through the stator slot, select a second image having a greatest amount of illumination, and measure the width based on the selected second image.

In addition to one or more of the features described herein, the tilting system includes a pivot, a first lift platform and a second lift platform configured to be linearly moved in a direction that is normal to the support surface, the first lift platform is configured to tilt the stator stack along the first direction, and the second lift platform is configured to tilt the stator stack along the second direction.

In addition to one or more of the features described herein, the tilting system includes a base structure supported by the pivot, the first lift platform and the second lift platform, the first lift platform and the second lift platform disposed orthogonally with respect to a location of the pivot.

In addition to one or more of the features described herein, rotating the stator slot includes incrementing the first lift platform when the second lift platform is at a default position, and rotating the stator slot along the second direction includes incrementing the second lift platform when the first lift platform is at a default position.

In addition to one or more of the features described herein, the edges of the stator slot include a first long edge and a second long edge opposing the first long edge, and the processing device is configured to construct a first best fit line for the first long edge, compare a first contour of the first long edge to the first best fit line, and identify a deviation based on a distance between the first best fit line and the first contour being greater than a selected distance threshold. The processing device is also configured to construct a second best fit line for the second long edge, compare a second contour of the second long edge to the second best fit line, and identify a deviation based on a distance between the second best fit line and the second contour being greater than a selected distance threshold.

In one exemplary embodiment, a computer program product includes a computer-readable memory that has computer-executable instructions stored thereupon, the computer-executable instructions when executed by a processor cause the processor to perform operations. The operations include locating a stator slot of a stator stack in a field of view of an imaging device, the imaging device having an imaging axis that is aligned relative to a surface of the stator stack, the stator stack disposed on a support surface of an inspection system, the inspection system including the imaging device and a tilting system configured to control an orientation of the stator slot relative to the imaging axis. The operations also include performing a depth measurement of the stator slot. The depth measurement includes rotating the stator slot along a first direction to a plurality of first orientations, taking a first image at each of the first orientations, and measuring a depth based on at least one of the first images. The operations further include performing a width measurement of the stator slot. The width measurement includes rotating the stator slot along a second direction to a plurality of second orientations, taking a second image at each of the second orientations, and measuring a width based on at least one of the second images, where the first direction is perpendicular to the second direction. The operations further include inspecting edges of the stator slot in the at least one of the first images to detect a potential deviation.

In addition to one or more of the features described herein, the inspection system includes an illuminator configured to apply illumination through the stator slot, and performing the depth measurement includes analyzing each first image to determine an amount of illumination through the stator slot, selecting a first image having a greatest amount of illumination, and measuring the depth based on the selected first image. Performing the width measurement includes analyzing each second image to determine an amount of illumination through the stator slot, selecting a second image having a greatest amount of illumination, and measuring the width based on the selected second image.

In addition to one or more of the features described herein, the tilting system includes a pivot, a first lift platform and a second lift platform configured to be linearly moved in a direction that is normal to the support surface, the first lift platform is configured to tilt the stator stack along the first direction, and the second lift platform is configured to tilt the stator stack along the second direction.

In addition to one or more of the features described herein, the tilting system includes a base structure supported by the pivot, the first lift platform and the second lift platform, the first lift platform and the second lift platform disposed orthogonally with respect to a location of the pivot.

In addition to one or more of the features described herein, rotating the stator slot along the first direction includes incrementing the first lift platform when the second lift platform is at a default position, and rotating the stator slot along the second direction includes incrementing the second lift platform when the first lift platform is at a default position.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIGS. 17A-F depict examples of images of the stator slot of FIGS. 16A and 16B, and illustrate examples of the calibration method.

DETAILED DESCRIPTION

Figure 1:
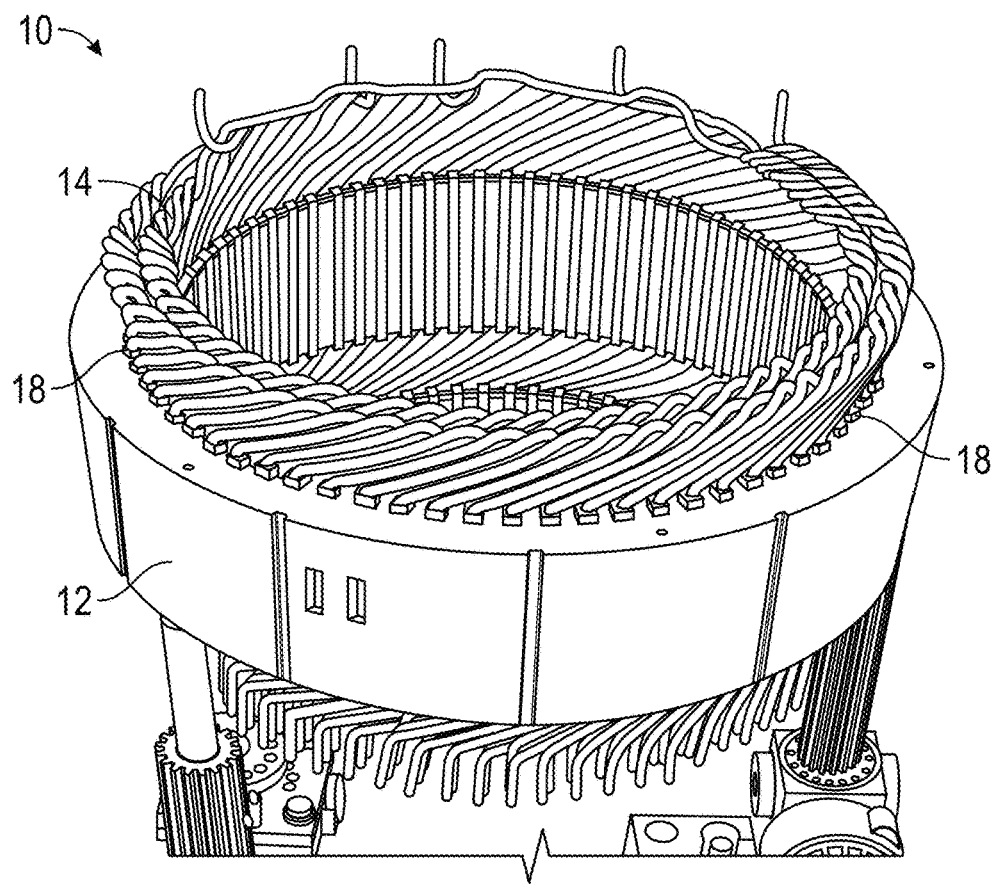
FIG. 1 depicts an example of components of a stator including a stator stack.

The following description is merely exemplary in nature and is not intended to limit the present disclosure, its application or uses. It should be understood that throughout the drawings, corresponding reference numerals indicate like or corresponding parts and features.

In accordance with one or more exemplary embodiments, methods, devices and systems are provided for inspecting stators and stator components. In an embodiment, the methods, devices and systems are configured to measure stator slot dimensions and inspect stators and stator components for deviations, such as geometric discontinuities and burrs. A "deviation" refers to any feature of a stator slot that deviates from a desired geometry, desired alignment or other desired configuration of the stator slot. Examples of deviations include burrs and other defects.

An embodiment of an inspection system includes a rotary table having a table surface configured to support a stator stack, an imaging assembly for taking images of individual stator slots of the stator stack, and an illuminator for applying illumination through a stator slot when the stator slot is imaged. For example, the imaging assembly is an optical camera having an imaging axis in a direction that is generally normal to the rotary table surface, so that images of each stator slot are taken from above. The illuminator applies illumination from under the stator stack through a slot during imaging.

When taking images, it is desirable to properly align the camera and the illuminator (or optics connected thereto) so that the imaging axis and the illumination axis align and are normal to the stator stack. Embodiments include calibration methods for determining the proper alignment of the imaging assembly and the illuminator with respect to one another and the rotary table surface (and/or a surface of the stator stack).

The inspection system also includes an alignment and monitoring system having a tilting assembly and a controller. The tilting assembly is controllable to adjust the orientation of the stator slot being imaged. In an embodiment, the tilting assembly includes a support structure mounted on a pivot (e.g., a ball joint) and two orthogonally arranged lift platforms. Each lift platform is linearly moveable so that the rotary table and stator stack can be moved according to six independent coordinates.

Embodiments also include methods for controlling the imaging assembly, illuminator and tilting assembly, and for inspecting stator slots to measure dimensions and detect deviations and defects. An embodiment of a method includes rotationally positioning the stator stack to place a stator slot in the camera's field of view, and taking a series of images at each of a plurality of orientations. Each image is analyzed to estimate an amount of light through the stator slot, and to estimate dimensions of the stator slot. An optimal orientation is selected from the different orientations based on the analysis. An "optimal orientation" is an orientation that permits the most amount of light to pass through the stator slot and/or provides for the most accurate measurements. Images at the optimal orientation are analyzed to measure dimensions and inspect the stator slot. The method is repeated for each selected stator slot in the stator stack.

Embodiments described herein present numerous advantages and technical effects. The embodiments provide for a non-contact inspection system that is able to quickly and efficiently inspect stator stacks, for example, during a stator and/or motor manufacturing process. The embodiments allow for quick inspection of stator slot dimensions, and automatic alignment of each individual slot to ensure that images are taken under optimal conditions. In this way, defects or deviations can be readily detected and addressed.

Figure 2:
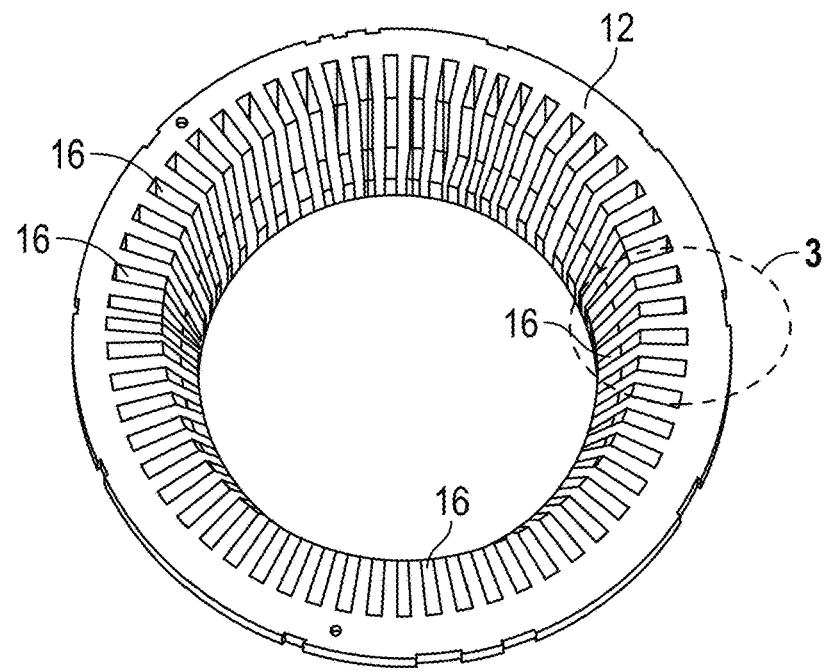
FIG. 2 depicts the stator stack of FIG. 1.

FIGS. 1 and 2 depict an example of a stator assembly 10, which includes a stator stack 12 formed by a plurality of laminations. The laminations may be produced via a stamping process. Stator windings 14 (e.g., heavy gage bar magnet wires) are wound through stator slots 16 in the stator stack 12. An insulator such as phase paper 18 is included within the stator slots 16, for example, by inserting the paper 18 into each stator slot 16 prior to inserting the windings 14.

The dimensional tolerance between the stator slots 16 and the windings 14 is tight, resulting in very small clearances. Undesirable features (generally referred to herein as "deviations"), such as burrs and geometric discontinuities (e.g., due to misalignment of the laminations), can negatively affect the clearance and can cause damage, failure and/or sub-optimal performance. For example, deviations can cause damage to the paper 18 and/or wire coatings, resulting in partial discharge and/or motor failure. Geometric deviations or discontinuities can affect a motor's electric and thermal performance (e.g., electrical deterioration of motor performance or potential Corona effects).

Embodiments provide an effective technique for measuring geometrical features of stator slots at various stages of manufacture. The embodiments are capable of quickly identifying defects, and can be effectively employed in large volume production processes. There are numerous challenges inherent in inspection of stator stacks, including difficulties in measuring slot dimensions and identifying possible burrs, particularly when it is desired to perform inspections under time constraints due to the speed of a manufacturing process. The embodiments described herein address such challenges and present significant improvements in inspection, manufacturing and quality control.

Figure 3:
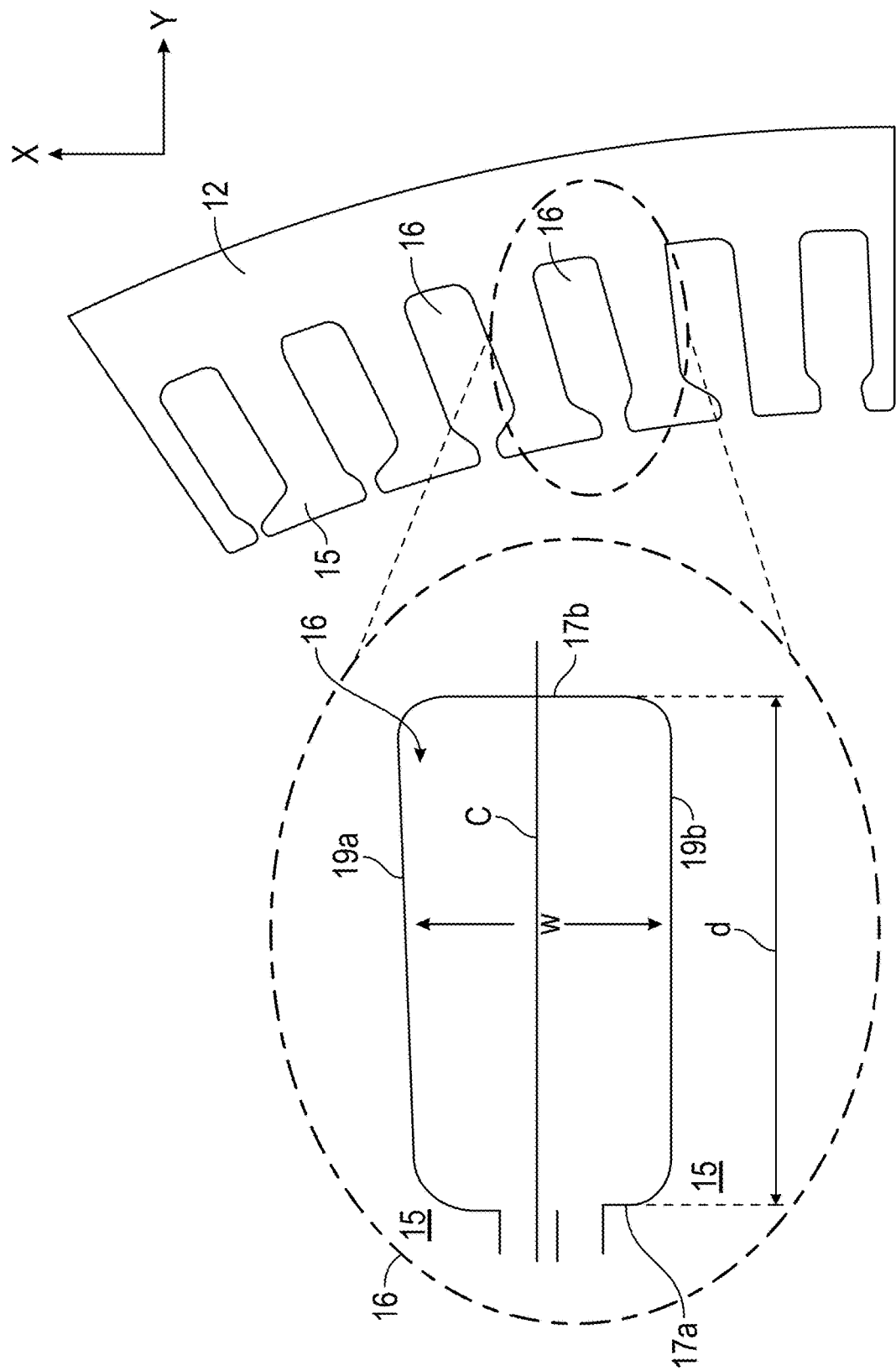
FIG. 3 illustrates an example of dimensions of a stator slot.

FIG. 3 shows a portion of the stator stack 12 (denoted as region "3" in FIG. 2) and a close up view of a stator slot 16, and illustrates an example of geometric features thereof. As shown, the stator slot 16 is defined by adjacent teeth 15, and has a depth d extending between short edges 17a and 17b. The stator slot 16 also has central longitudinal axis C, and a width w between a first long edge 19a and an opposing long edge 19b. The width w may be variable (e.g., the width w is greater near the teeth 15).

Figure 4:
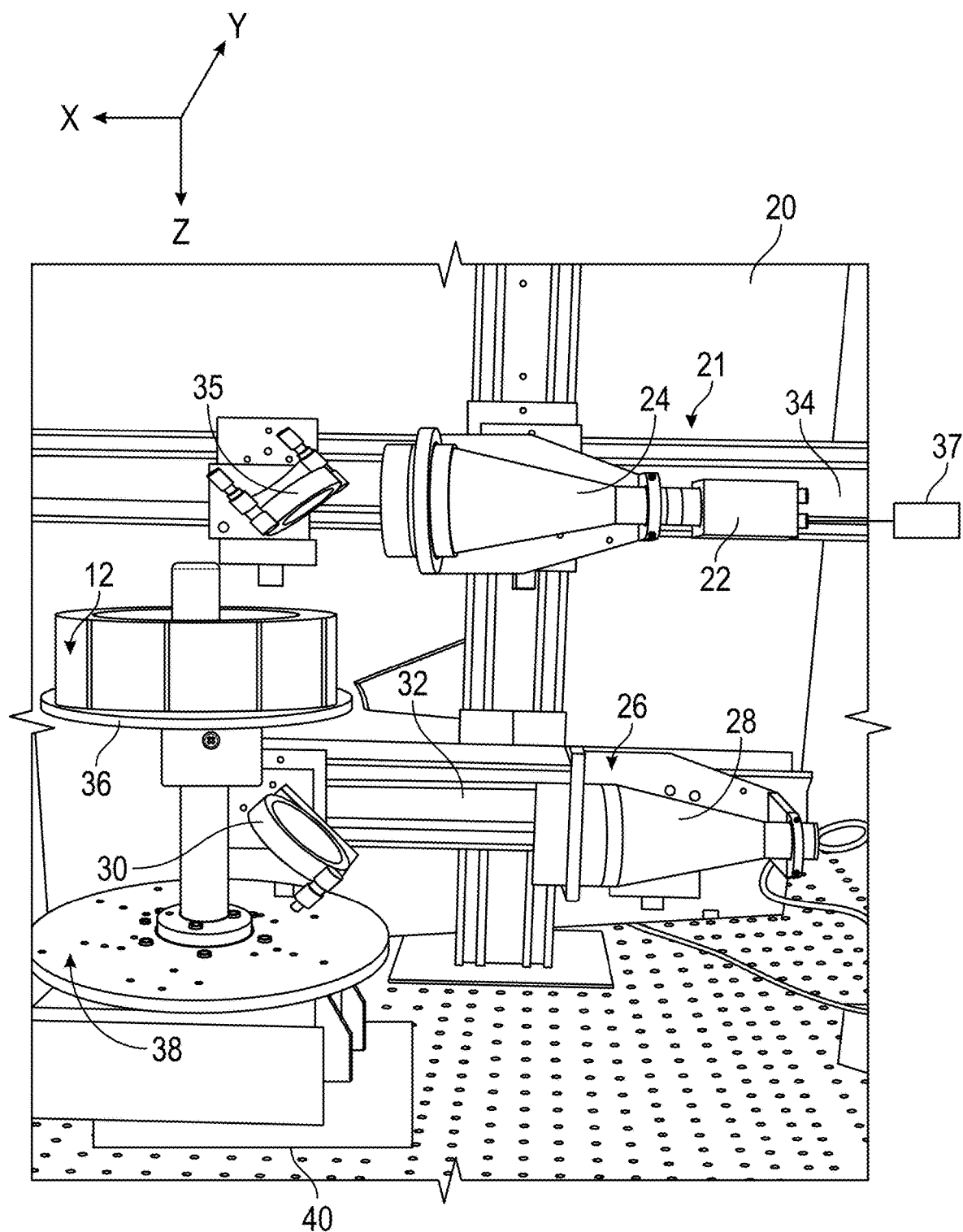
FIG. 4 depicts an inspection and monitoring system for optically inspecting stator slots, in accordance with an exemplary embodiment.
Figure 5:
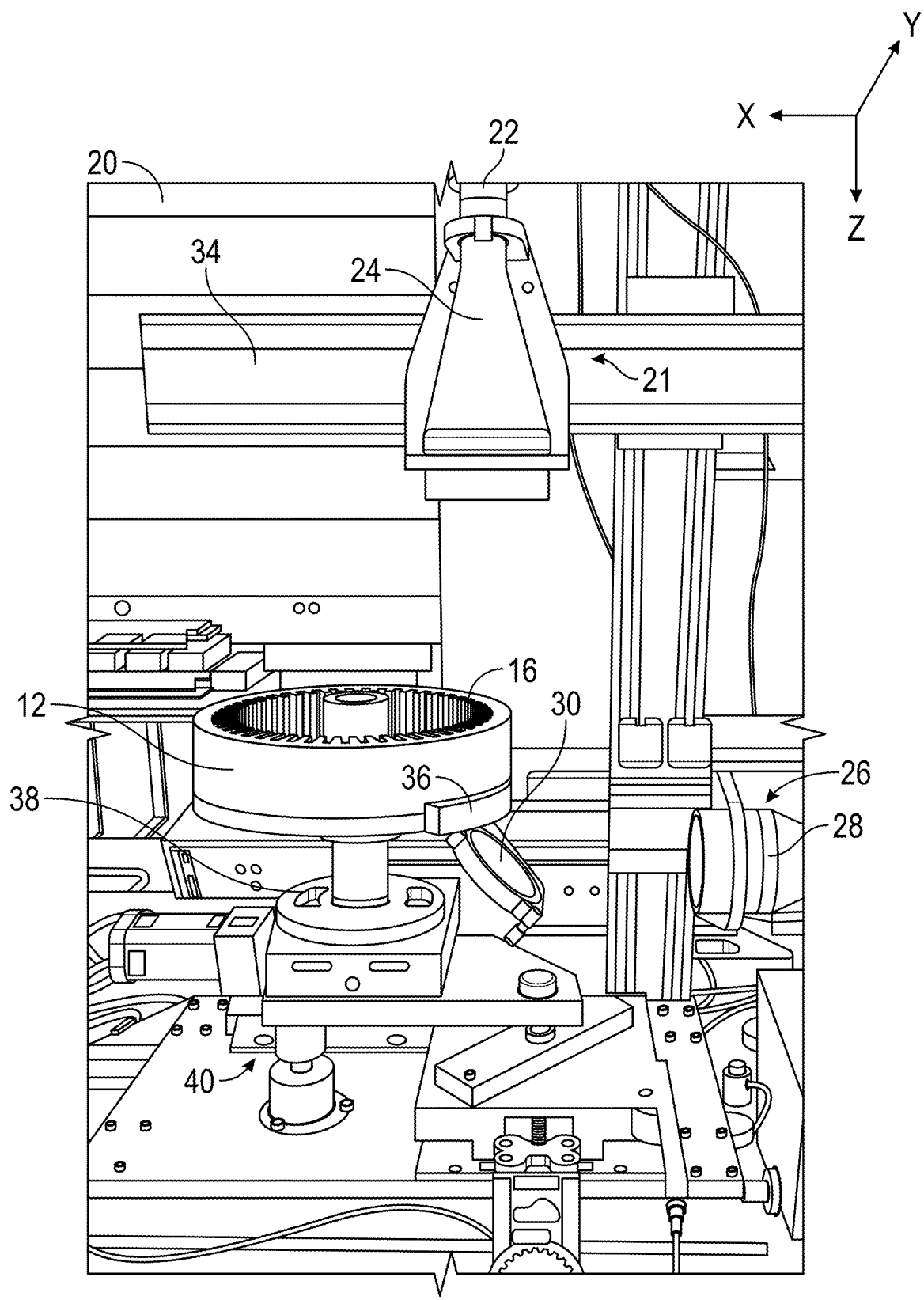
FIG. 5 depicts an inspection and monitoring system for optically inspecting stator slots, in accordance with an exemplary embodiment.

FIGS. 4 and 5 depict embodiments of an inspection system 20, which includes an imaging assembly 21. It is noted that various embodiments are discussed in conjunction with a coordinate system defined by orthogonal x-, y- and z-axes for illustration purposes.

The imaging assembly 21 has an imaging device 22, such as an optical camera, configured to acquire images of the stator slots 16 via a telecentric lens 24. The images are taken from above the stator stack 12, such that the imaging axis is at least substantially orthogonal to an x-y plane defined by the x-axis and the z-axis. The x-y plane may correspond to a surface of a rotary table 36 when in a default level position.

An illumination assembly 26 includes an illuminator 28 (e.g., a telecentric illuminator) and a mirror 30 configured to direct illumination from below the stator stack 12 and through the stator slot 16 being imaged. The illuminator 28 has an illumination axis that is preferably aligned with the imaging axis (i.e., parallel to and coincident with the imaging axis). The imaging device 22 may be mounted on a rail 34, and the illuminator 28 may be mounted on a rail 32, to allow for lateral adjustment (e.g., along a direction parallel to the x-y plane).

FIG. 4 depicts an embodiment in which the imaging device 22 and the illuminator 28 are arranged in parallel with each other and with the x-y plane. A mirror 35 is included as part of the imaging assembly 21, so that the imaging device 22 can acquire top-down images. FIG. 5 depicts an embodiment in which the imaging device 22 is arranged orthogonal to the illuminator 28, and the mirror 35 is excluded.

As shown in FIG. 4, the imaging device 22 may be connected to a processing unit 37. The processing unit 37 may be configured to perform various functions, such as receiving and analyzing images, controlling operation and position of the imaging assembly 21 and the illumination assembly 26, and operating a tilting system 40 discussed below.

The stator stack 12 can be mounted on a support structure that includes a platform 38 and a rotary table 36 that is controlled to rotate the stator stack 12 about the z-axis so that each desired stator slot 16 can be imaged by the imaging device 22.

Figure 6:
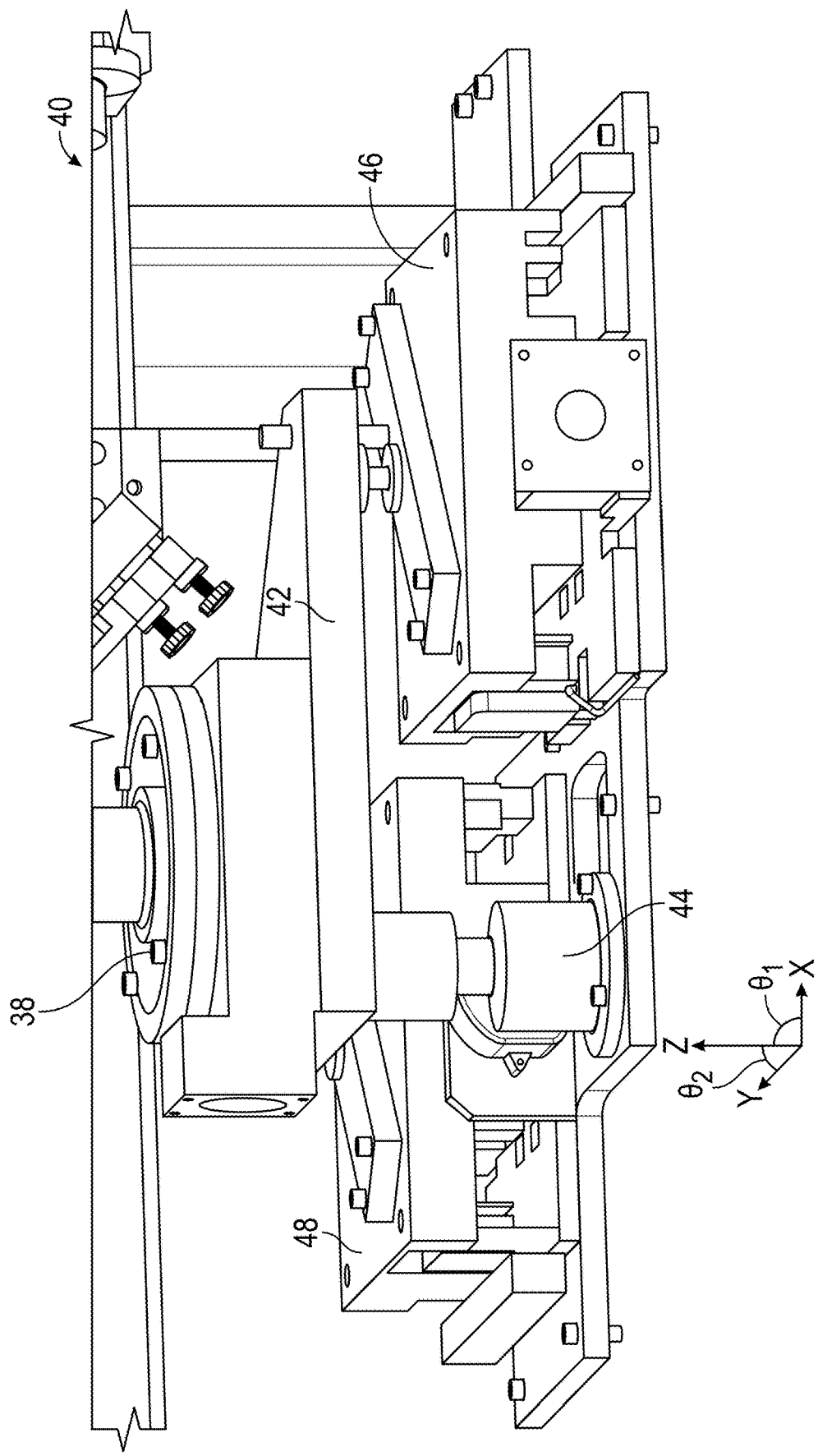
FIG. 6 depicts a tilting system controllable to adjust an orientation of a stator slot, in accordance with an exemplary embodiment.

Referring to FIG. 6, in an embodiment, the support structure and the stator stack 12 are supported by a kinematic tilting system 40. The tilting system 40 includes a base structure 42 (also referred to as a base 42) mounted on a pivot 44 (e.g., a ball joint) and supported by two lift platforms 46 and 48 so that the base 42 can be tilted as desired. Each lift platform is moveable vertically (along the z-axis) using linear stepper motors or other suitable actuators. The lift platforms 46 and 48 are arranged orthogonally with respect to the location of the pivot 44. The tilting system 40 allows the position and orientation of the stator stack 12 (or stator slot 16) to be defined in terms of six independent coordinates, including three translations (e.g., in the x, y and z directions) and three rotations (e.g., about the y-axis, about the x-axis and about the z-axis).

In this embodiment, a first lift platform 46 (also referred to as an "alpha lift") is configured to tilt the base 42 so that the base 42 rotates along the x-axis. In other words, the first lift platform 46 causes the base 42 to rotate and define a first angle $\theta_1$ between the x-axis and the z-axis (where an angle of zero degrees indicates that the base 42 is level with respect to the x-axis). The first lift platform 46 may be used in conjunction with the imaging assembly 21 to measure a depth d of a stator slot as discussed further herein.

The second lift platform 48 (also referred to as a "beta lift") is configured to tilt the base 42 so that the base 42 rotates along the y-axis. The second lift platform 48 causes the base 42 to rotate and define a second angle $\theta_2$ between the y-axis and the z-axis (where an angle of zero degrees indicates that the base 42 is level with respect to the y-axis). The second lift platform 48 may be used with the imaging assembly 21 to measure a width w of a stator slot as discussed further herein.

The kinematic tilting system 40 and the inspection system 20 may be used to image or inspect components of the stator stack 12. In an embodiment, the imaging device 22 is used to successively image each stator slot 16 (or selected slots 16), by taking images of a given slot and then rotating the stator stack 12 to locate an adjacent slot 16 or other slot 16 under the imaging device 22. For each stator slot 16, the stator slot 16 is oriented via the tilting system 40 to maximize the view into the stator slot 16 and allow for a full view of the stator slot edges. For example, the stator slot 16 is first oriented relative to the x-axis by actuating the alpha lift 46, and one or more first images of the stator slot 16 are taken. Additional images are taken as the alpha lift 46 is at different vertical positions, and the images are used to determine optimal alignment (e.g., optimal angle $\theta_1$). The images may also be used to measure short edges of the stator slot 16 and the depth d (e.g., by analyzing an image taken at the optimal alignment or optimal angle $\theta_1$).

The stator slot 16 is then oriented relative to the y-axis by actuating the beta lift 48, optionally after returning the alpha lift 46 to a default position (e.g., angle $\theta_1$ is zero). One or more second images of the stator slot 16 are taken at a first beta lift position. Additional images are taken when the beta lift 48 is at different vertical positions. One or more images are analyzed to inspect long edges of the slot 16 and measure width, and/or determine optimal alignment (e.g., optimal angle $\theta_2$). For example, an image taken at the optimal alignment or optimal angle $\theta_2$ is analyzed to measure and/or inspect the long edges. In addition, one or more images of the long edges may be inspected to identify any defects or deviations, such as burrs.

It is noted that although embodiments are described herein in the context of stator slots, they are not so limited and can be used to image any desired component, object or surface.

Figure 7:
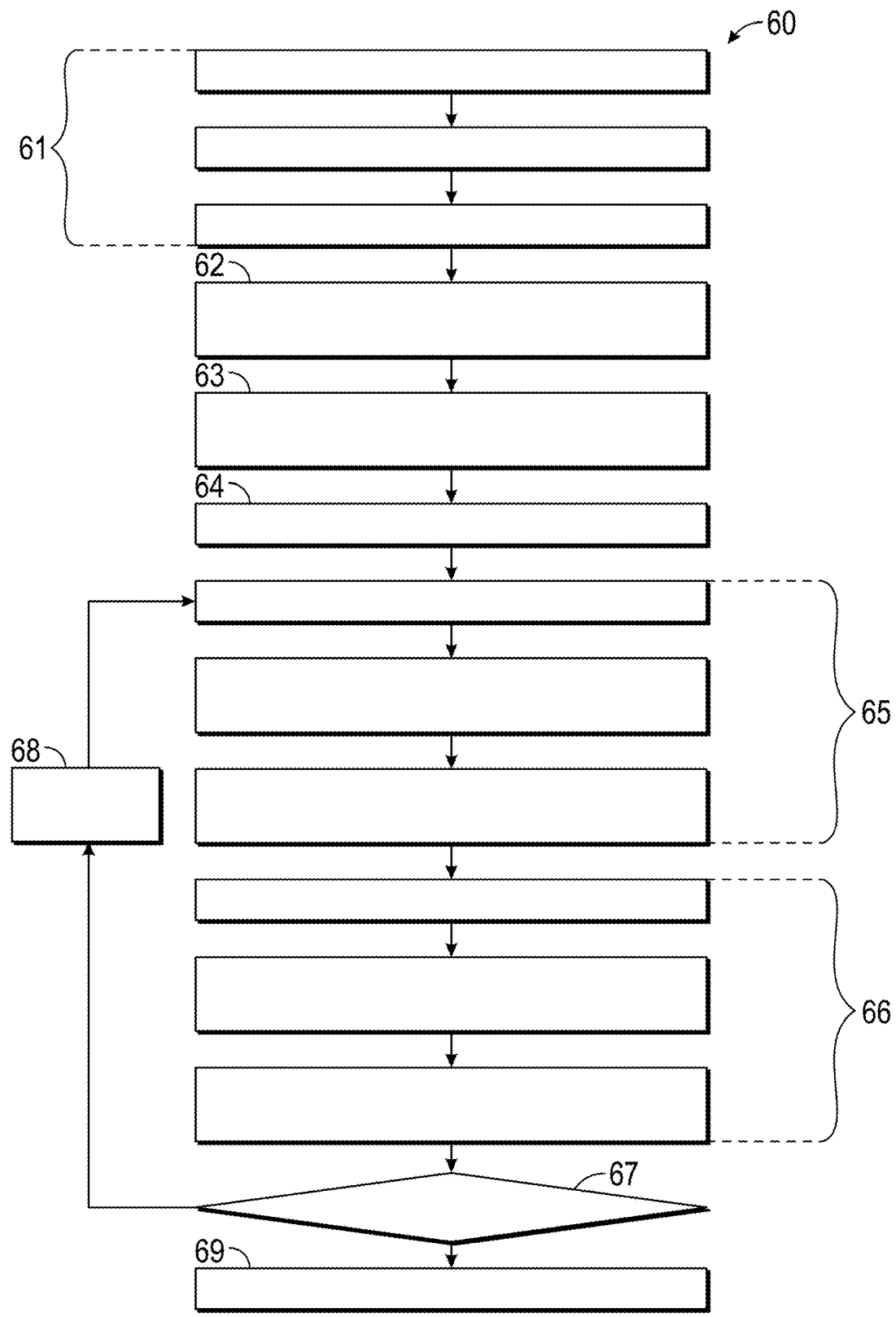
FIG. 7 is a flow diagram depicting aspects of a method of inspecting a stator slot and stator stack, in accordance with an exemplary embodiment.

FIG. 7 illustrates an embodiment of a method 60 of inspecting a stator stack 12 and stator slots 16. Aspects of the method 60 may be performed by a processor or processors, such as the processing unit 37 (alone or in conjunction with other processors, such as a tilting assembly controller). It is noted the method 60 may be performed by any suitable processing device or system, or combination of processing devices. The method 60 is discussed in conjunction with the stator stack 12 and the tilting system 40, but is not so limited, as the method 60 may be performed on other components or objects, and the method 60 may be performed using any device or system capable of changing orientations as discussed herein.

The method 60 includes a number of steps or stages represented by blocks 61-69. The method 60 is not limited to the number or order of steps therein, as some steps represented by blocks 61-69 may be performed in a different order than that described below, or fewer than all of the steps may be performed.

At block 61, the inspection system 20 is initially calibrated to ensure that the imaging assembly 21 and the illuminator 28 are properly aligned. In an embodiment, the inspection system 20 is properly calibrated when the imaging axis, the illumination axis and a length axis (perpendicular to an imaged surface) are parallel.

In an embodiment, the imaging assembly 21 and the illumination assembly 26 are calibrated by acquiring an image of a reference slot in a reference artifact, or acquiring an image of a reference slot in each of a plurality of reference artifacts. Each artifact is an object (e.g., a reference block) having a reference slot. The artifacts are imaged using the imaging assembly 21 and analyzed to determine whether the imaging device 22 and the telecentric lens 24 are properly aligned with the illuminator 28. For example, one artifact represents a narrow portion of a stator slot 16 (a portion between ends of adjacent teeth) and another artifact represents a wide portion of a stator slot 16 (a portion extending radially outwardly from the portion). Edge detection is performed on an image of the narrow portion to detect opposing edges, and a gradient profile of one edge is compared with a gradient profile of an opposing edge. The profiles are compared to determine a similarity therebetween. If the profiles are sufficiently similar (e.g., within a selected gradient difference), the narrow portion is properly aligned. Edge detection and comparison is similarly performed on the wide portion. If the wide and/or narrow portion is not properly aligned, the imaging device 22 is adjusted and the above artifact analysis procedure is repeated.

In an embodiment, the imaging assembly 21 is calibrated by acquiring an image of a reference slot in each of a plurality of reference artifacts. Each artifact is an object (e.g., a reference block) having a reference slot. The artifacts are imaged using the imaging assembly 21 and analyzed to determine whether the imaging device 22 and the telecentric lens 24 are properly aligned with the illuminator 28. For example, one artifact is a reference block having a first thickness, which includes a representative stator slot. Another artifact is a reference block including a representative stator slot, and having a second thickness that is different than the first thickness. Images of each reference block are taken, and the dimensions of the reference slots are measured in the images. If the measured dimensions are within a threshold difference from actual dimensions of the reference slots, the imaging assembly is properly aligned.

At block 62, the stator stack 12 is mounted on the rotary table 36, and the stator slots 16 in the camera view are observed. At block 63, the rotary table 36 and/or the stator stack 12 is rotated so that the current slot 16 (i.e., slot to be imaged) is in an angular position with respect to the edges of the image and with respect to the x and y-axes. This prevents aliasing phenomena from occurring.

At block 64, a coordinate system is defined for the stator slot 16. In an embodiment, the coordinate system is defined by specifying an initial coordinate system, detecting one or more edges of a slot 16, and rotating or translating to a new coordinate system based on the orientation of the edge(s).

Figure 8:
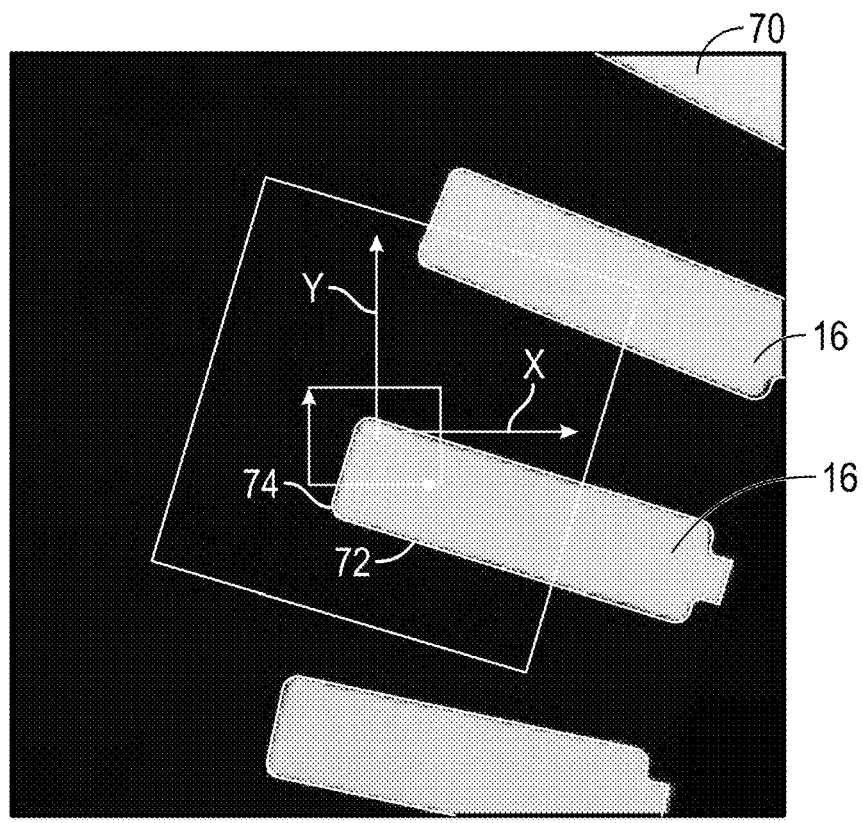
FIG. 8 is an example of an image of a stator slot and an initial coordinate system.

FIG. 8 depicts an example of an image 70 of stator slots 16 as viewed by the camera. An initial coordinate system is defined, for example, as having an x-axis and a y-axis that are aligned with sides or boundaries of the image 70.

Figure 9:
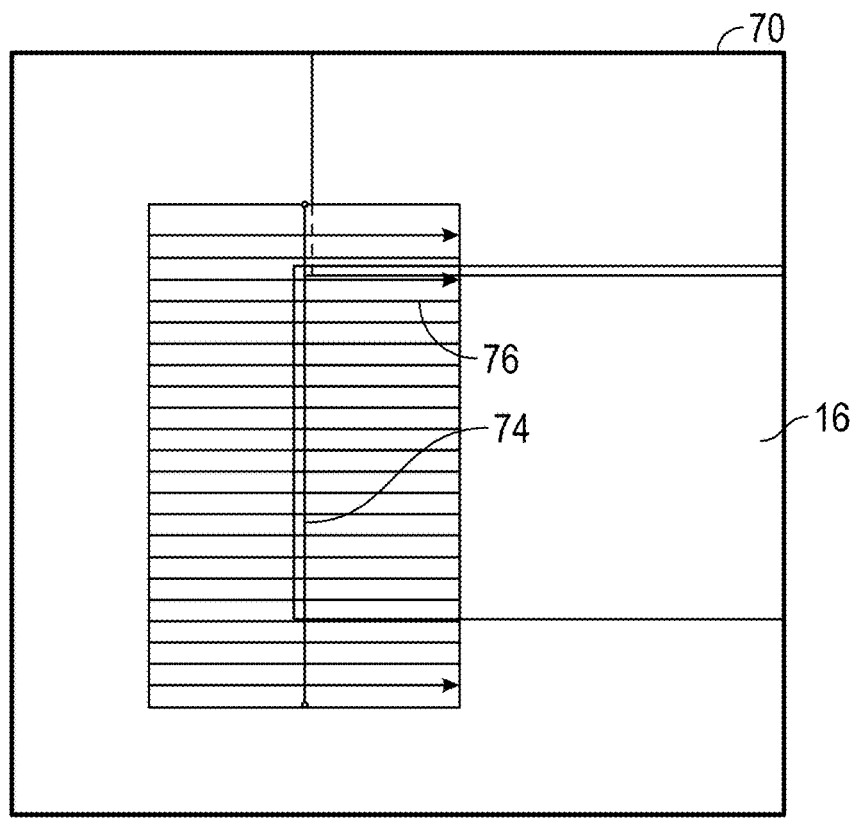
FIG. 9 depicts aspects of an edge detection method or process, in accordance with an exemplary embodiment.

Edge detection is performed to detect a long edge 72 of the slot 16 and a short edge 74, and the edges are used to define a new coordinate system. FIG. 9 shows an example of aspects of an edge detection process for detecting the short edge 74.

As shown in FIG. 9, a rectangular search area or region of interest (ROI) 76 is defined, which includes a plurality of parallel lines along which a search is performed for a gradient (e.g., a gradient above a threshold value) in an image attribute (e.g., brightness, contrast, gray scale, etc.) or pixel value. Pixels at which the gradient exceeds a threshold are used to define the short edge 74.

Figure 10:
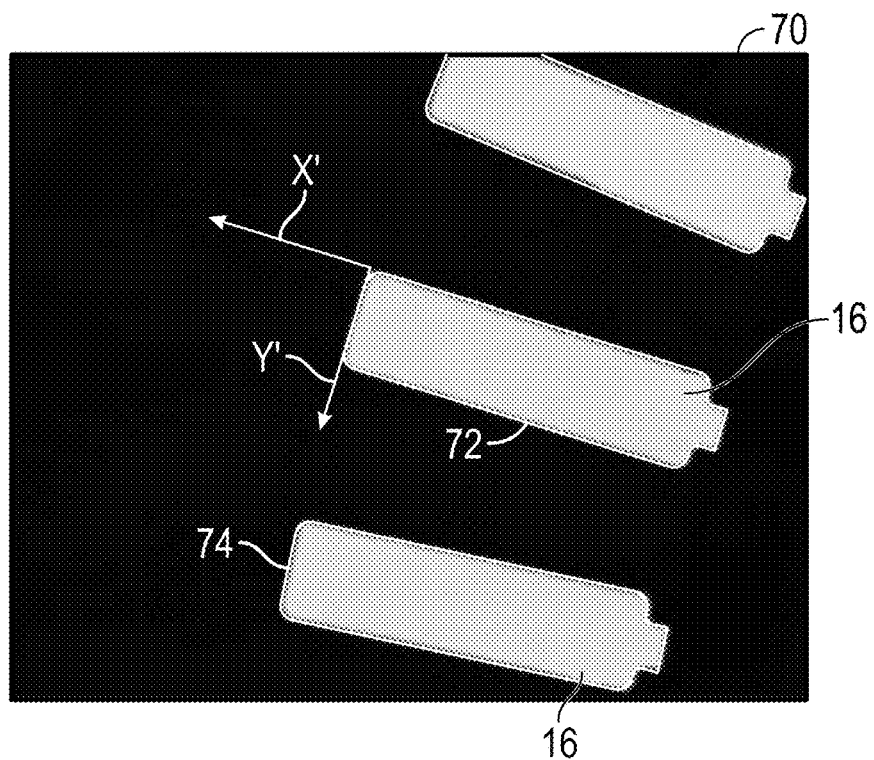
FIG. 10 depicts an example of a coordinate system used for measuring an image of a stator slot.

Once the short edge and long edge orientations are determined, a new coordinate system is defined based on the edge orientations. For example, as shown in FIG. 10, a new coordinate system is defined having an x'-axis parallel to a long edge 72 (or parallel to the central axis C) and a y'-axis parallel to a short edge 74.

Referring again to FIG. 7, at block 65, a width measurement and defect identification process is performed to determine a width of the stator slot 16, and to identify any burrs, defects or other deviations along the width of the slot (and along the long edges 72).

In an embodiment, the width measurement and defect identification process includes taking images of the slot 16 at each of a plurality of orientations. The orientations are achieved, in an embodiment, by actuating the beta lift 48 so that the stator stack 12 is oriented at different values of the angle $\theta_2$. At each orientation, an image is acquired, and the acquired images are analyzed as discussed further herein to determine an optimal angle $\theta_2$ and to measure the width. Measurements of width w may be taken using an acquired image or images corresponding to the optimal angle $\theta_2$. The beta lift 48 may be returned to a default position after the width measurements are complete. The width measurements may be performed when the alpha lift 46 is maintained at a default position, but the method 60 is not so limited.

At block 66, a depth measurement and defect identification process is similarly performed to determine dimensions including depth d of the stator slot 16, and to identify any deviations (e.g., burrs) along the short edges 74. The process includes actuating the alpha lift 46 to orient the stator stack 12 at multiple orientations, and taking an image of the stator slot 16 at each orientation. An acquired image for each orientation is analyzed as discussed further herein to determine an optimal angle $\theta_1$ and measure the depth. Measurements of depth d may be taken using an acquired image or images corresponding to the optimal angle $\theta_1$. The depth measurements may be performed when the beta lift 48 is maintained at a default position, but the method 60 is not so limited.

At block 67, it is determined whether there are additional stator slots 16 to be measured. If so, at block 68, the stator stack 12 is rotated so that the next adjacent stator slot 16 (or other selected slot 16) is centered in the camera view and the steps at blocks 65 and 66 are repeated.

When all of the selected stator slots 16 have been measured, the results may be displayed to a user (e.g., engineer or technician) and/or another processing device or storage location, at block 69.

Various actions may be taken if there is a defect or deviation, or if dimensions of a slot are incorrect. For example, the stator stack 12 may be removed from a manufacturing process, or a manufacturing process may be adjusted to correct any errors. Slots having identified burrs can be addressed by shearing, smoothing or otherwise shaping the slots.

In an embodiment, images are analyzed to determine a proper orientation by measuring image attributes that are related to an amount of light that is transmitted through a stator slot 16 when imaged. For example, the brightness of a portion of an image through the slot 16 is measured and compared to the other images of the slot 16 to determine which image has the most amount of light through the slot (i.e., a peak brightness). Images corresponding to different orientations may be successively acquired and analyzed until the peak brightness is found.

The width w of a stator slot 16 in an image is measured using any suitable image analysis technique. In an embodiment, the width is measured by calculating an average width based on determining multiple distances between the long edges 72 (e.g., distances at the ends of the long edges 72). A distance (e.g., along the y'-axis) may be defined by a set of opposing points (i.e., a distance between a point on a long edge 72 and a point on an opposing long edge 72). The points may be selected from each long edge 72 as detected or selected from a best fit line generated for each long edge 72.

Figure 11:
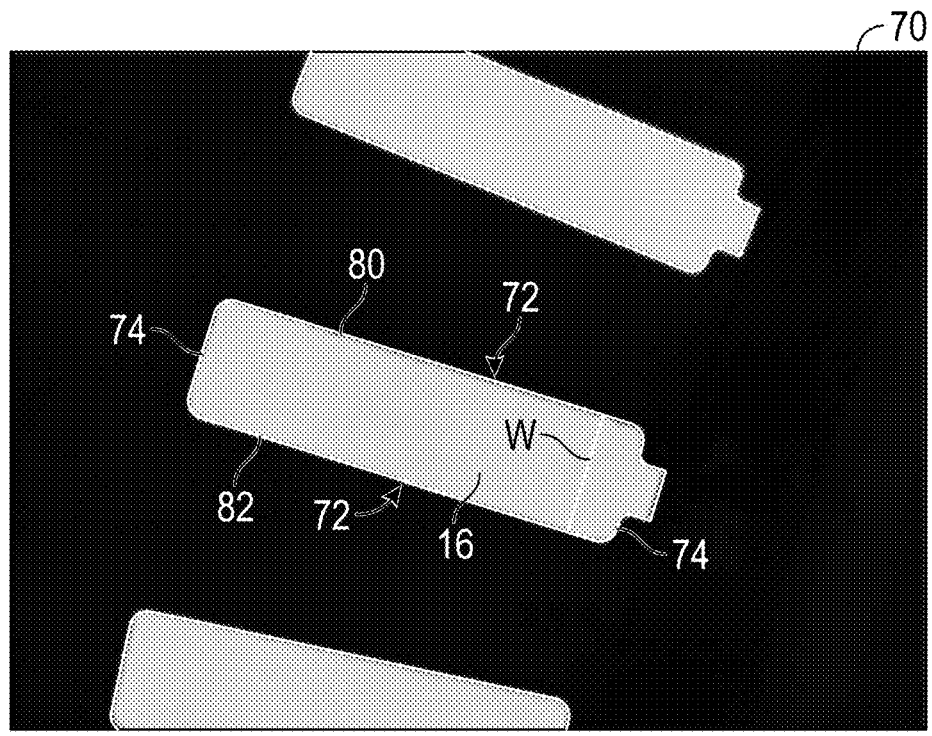
FIG. 11 depicts an example of an image of a stator slot, and illustrates aspects of measuring a stator slot in the image.

The width measurement can be performed at each orientation, or performed only on the image corresponding to the peak brightness. For example, as shown in FIG. 11, best fit lines 80 and 82 are determined (e.g., via a rake function) for each long edge 72, and the width w is calculated at multiple locations.

Figure 12:
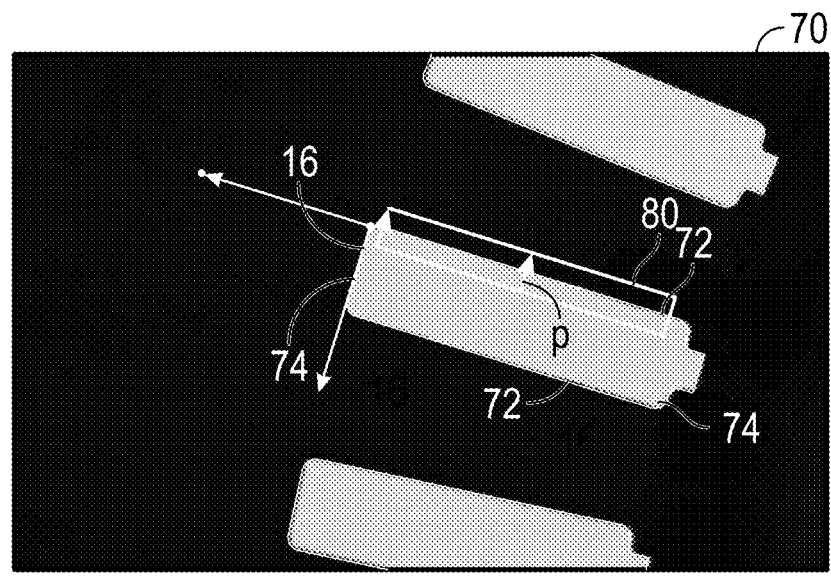
FIG. 12 depicts the image of FIG. 11, and illustrates aspects of inspecting an edge of the stator slot and identifying one or more deviations, in accordance with an exemplary embodiment.

FIG. 12 illustrates aspects of an embodiment of an inspection method for detecting burrs and other deviations along the long edges 72. The method includes determining the best fit line 80, and calculating a distance p between an edge contour and the best fit line 80 at multiple locations along the edge 72. A maximum distance pmax represents the extent of a potential burr or deviation. A minimum width of the slot 16 may be calculated by subtracting the maximum distance pmax from the width w (or average width). Although FIG. 12 only shows inspection of one long edge 72, it is understood that the other long edge is similarly inspected.

Figure 13:
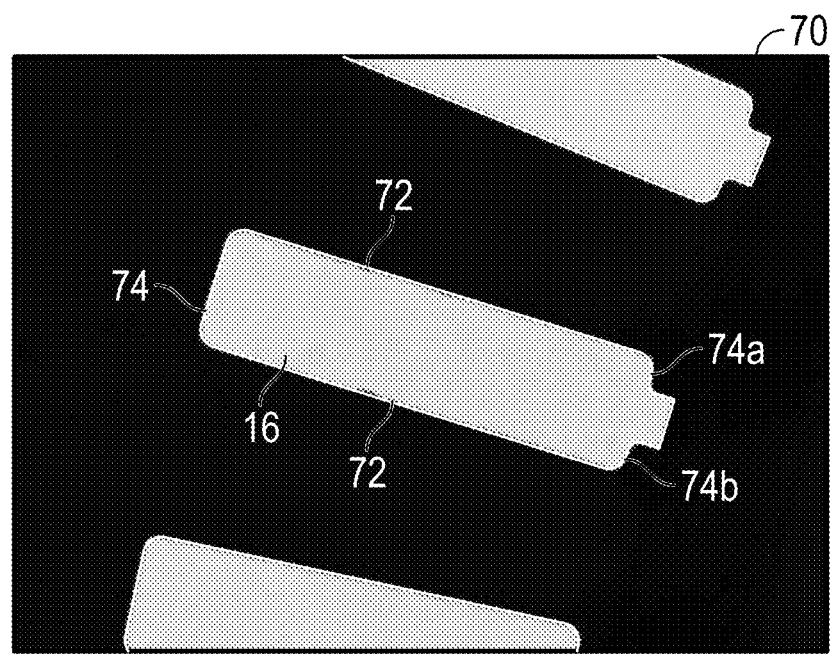
FIG. 13 depicts the image of FIG. 11, and illustrates aspects of inspecting an edge of the stator slot and identifying one or more deviations, in accordance with an exemplary embodiment.

The depth d of a stator slot 16 in an image can be measured using any suitable image analysis technique. In an embodiment, the depth is measured by calculating an average depth based on determining a distance between the short edges 74. For example, as shown in FIG. 13, a depth d (along the x'-axis) is calculated on either side of a stator tooth. An edge 74a is detected, and a first distance is calculated between the edge 74a and the opposing edge 74 (or between best fit lines). A second distance is similarly calculated between the edge 74b and the opposing edge 74, and an average depth is calculated.

Figure 14:
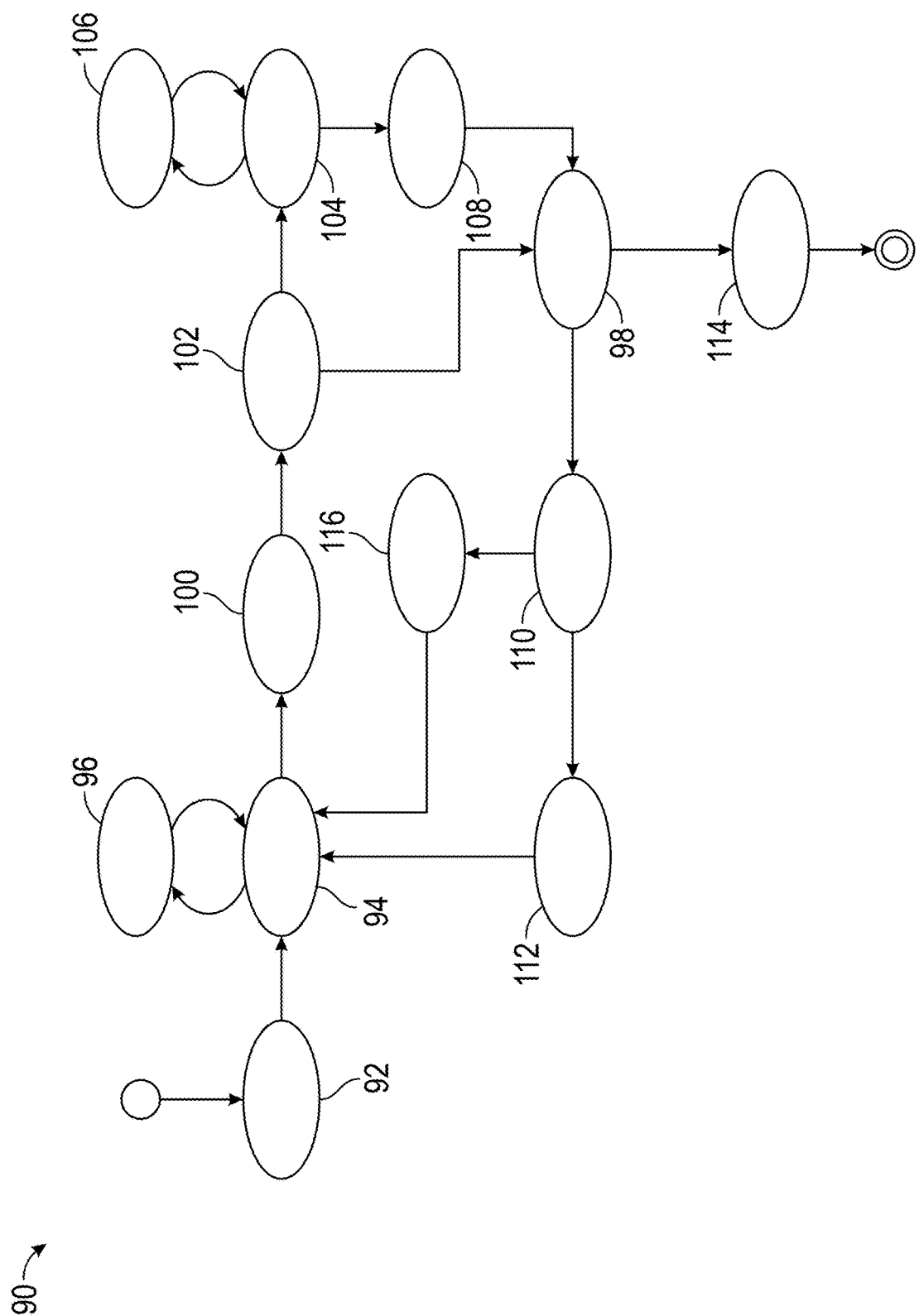
FIG. 14 depicts a state machine used to perform aspects of the method of FIG. 7, in accordance with an exemplary embodiment.

An embodiment of a measurement and inspection method is discussed with reference to FIG. 14. The various method steps or stages are performed via a state machine 90 that directs a processing device to control the tilting system 40, control image acquisition, perform various calculations and measurements, and store measurements (e.g., as variables) and other data. It is noted that the method is not limited to use with a state machine, as the steps or stages can be performed using another type of algorithm.

Each of the states in the state machine 90 has a default transition with a default dependency condition. One or more of the states can be changed to transition to user-selected parameters.

The method starts and the tilting system 40 is in a default position. In the default position, the rotary table 36 is level (i.e., orthogonal to the imaging axis), and the inspection system 20 is in a reset state 92. For example, the state machine 90 causes the alpha lift 46 and the beta lift 48 to be adjusted by actuating their respective stepper motors until proximity sensors at each lift are triggered. The alpha and beta lifts may then be moved at the same increments to put the system at a desired default position.

Adjustment of the alpha and beta lifts may be performed in motor steps, also referred to as increments. Each increment is a defined distance along the z-axis. However, embodiments described herein are not so limited, as the lifts can be adjusted using any suitable actuator or adjustment technique.

The state machine 90 transitions to a "measure b" state 94, in which an initial image is taken at the default orientation and width measurements are performed. In an embodiment, the beta lift 48 is then moved in a negative or downward direction, so that the beta lift 48 can be moved upward in increments through various positions as subsequent images are taken.

The initial image is analyzed to determine an amount of light that passes through the imaged stator slot 16. The amount of light may be determined by pixel count (i.e., the number of pixels in the image that meet (e.g., are greater than or equal to, or less than or equal to) a selected image attribute threshold). For example, the initial image is analyzed to determine the number of pixels that meet or exceed a selected brightness value. In another example, the pixel count is a number of pixels that have a gray scale value that is less than or equal to a selected gray scale value threshold. The highest pixel count at a given point in the method is referred to as a peak pixel count or peak illumination.

The state machine 90 transitions to a "jog beta" state 96, at which the beta lift 48 is moved to another position (e.g., is incremented upward), and then transitions back to the measure b state 94 and an image is acquired at the position. The state machine transitions 90 between these states (taking images at successive positions) until an image having a peak pixel count or peak measurement is found.

It is noted that the width w (e.g., an average width) may be measured in each image, and the edges many be inspected or analyzed for detection of deviations. Measurement data may be stored via a "data log" state 98.

Once the peak pixel count is found, the position of the beta lift 48 is logged as the peak or best beta lift position, and the state machine 90 transitions to an "adjust b" state 100, in which the beta lift 48 is moved back to the default position.

The state machine 90 transitions to a "prepare a" state 102, in which the alpha lift 46 is moved downward to an initial position by a selected number of increments. At a "measure a" state 104, an initial image is taken at the initial orientation and depth d measurements are performed. The initial image is analyzed to determine an amount of light that passes through the slot 16, for example, by calculating a pixel count corresponding to the number of pixels that meet a selected image attribute threshold.

The state machine 90 transitions to a "jog alpha" state 106, at which the alpha lift 46 is moved to another position (e.g., is incremented upward) and then back to the measure a state 104, at which in image is taken. The state machine 90 transitions between these states until an image having a peak pixel count is found. The depth d may be measured in each image, and the short edges 74 may be inspected or analyzed for detection of deviations. Measurement data may be stored via the data log state 98.

Once the peak pixel count is found, the position of the alpha lift 46 is logged as the peak or best alpha lift position, and the state machine 90 transitions to an "adjust a" state 108, in which the alpha lift 46 is moved back to the default position.

The state machine 90 then transitions to a "slot number" or "slot #" state 110 if additional slots are to be imaged, and the slot number is noted. The state machine transitions to a "next slot" state 112 and the rotary table 38 is rotated to put an adjacent slot in the imaging device's field of view. The adjacent slot is imaged and the lifts are controlled as discussed above. If all slots have been imaged, the state machine transitions to a "last slot" state 114 and the method ends. In some cases, it is desirable to measure a subset of the slots (e.g., every sixth slot). If fewer than all of the slots are being imaged, the state machine can track the slot numbers and skip a slot by transitioning to a "skip slot" state 116

Figure 15:
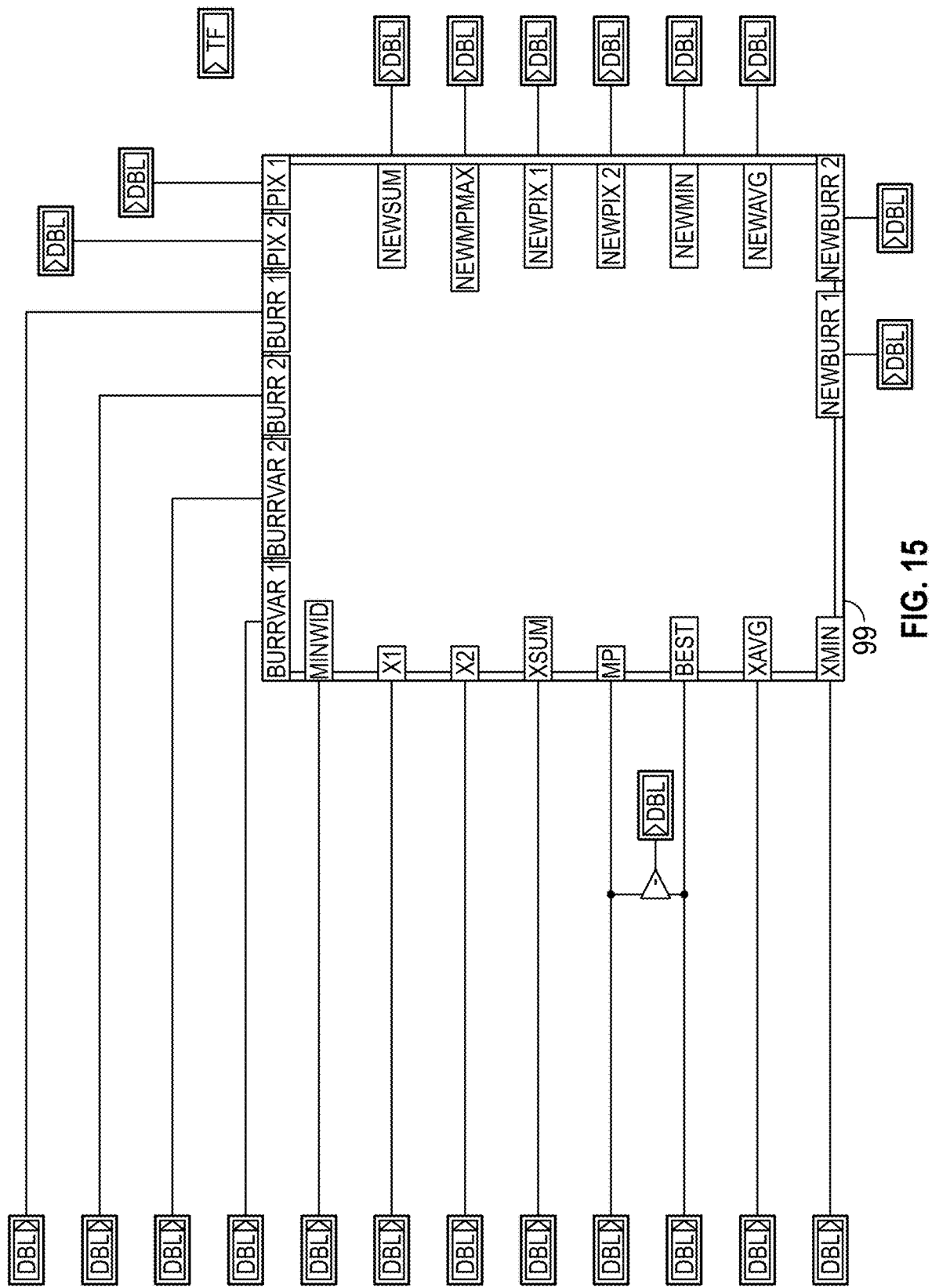
FIG. 15 depicts a calculator, in accordance with an exemplary embodiment.

FIG. 15 depicts an example of a peak width calculator 99 that is used to provide a running average tabulation to smooth out stray measurements. For each taken image (the "current image"), the calculator 99 compares image measurements and analysis results to previously recorded data, and determines whether the current image represents a peak measurement (e.g., peak pixel count or peak illumination). In this way, a running record of the peak measurement is maintained.

In the calculator 99, "xsum" represents the peak measurement, and is calculated based on an average of the first width and the second width in combination with the pixel count of the peak measurement. Values "burrvar1" and "burrvar2" represent the maximum distance values used to identify burrs (burrvar1 is a maximum distance between the first long edge and a fitted line, and burrvar2 is a maximum distance between the second long edge and fitted line) of the peak measurement. The beta lift position (beta motor position) associated with the peak measurement is "best".

For a current measurement, the calculator 99 receives as inputs a calibrated maximum distance value from inspection of the first long edge as a variable "burr1", and a calibrated maximum distance value from inspection of the second long edge as a variable "burr2." The pixel count representing the amount of illumination is input as variables "pix1" and "pix2." The variable pix1 represents a raw pixel distance (e.g., measured in number of pixels) between the edges at a location along the depth of the stator slot 16. The variable pix2 represents a raw pixel distance between the edges at a different location along the depth of the stator slot 16.

The distance between the long edge best fit lines at one end of the stator slot 16 is input from the current measurement as variable "x1", and the distance between the lines at a second end is input as variable "x2". The minimum width is input as "minw". The motor position "mp" of the current measurement is decremented from motor position of the peak measurement ("best"). "xavg" is an average width of the slot. A minimum distance "xmin" may be selected (e.g., to minimum distance between adjacent teeth, selected so that wires can be inserted into the slot)

The calculator calculates the average of x1 and x2, denoted "avgvar" and adds the avgvar to the pixel count. The resulting value "xnew" represents the current measurement. xnew is compared to xsum. If xnew is less than or equal to xsum, the existing parameter of xsum is maintained as an output of the calculator 99. If xnew is greater than xsum, the calculator 99 outputs the parameters of the current measurement. For example, if xnew is greater than xsum, the new best position of the beta lift ("newmpmax") is the current motor position "mp". Variables "burr1" and "burr2" will be input as inspection variables "burrvar1" and "burrvar2" for the next measurement.

Figure 16A:
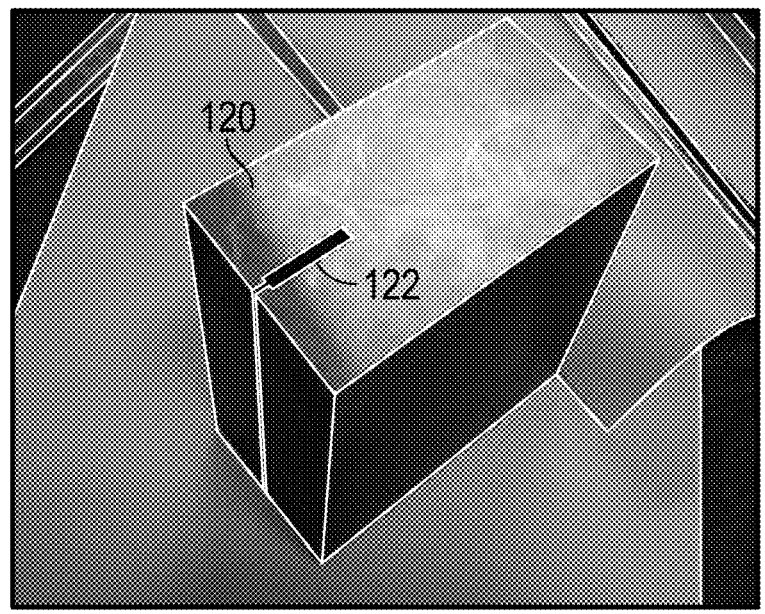
FIGS. 16A and 16B depict a reference stator slot and an image thereof, used in performing a calibration method, in accordance with an exemplary embodiment.
Figure 16B:
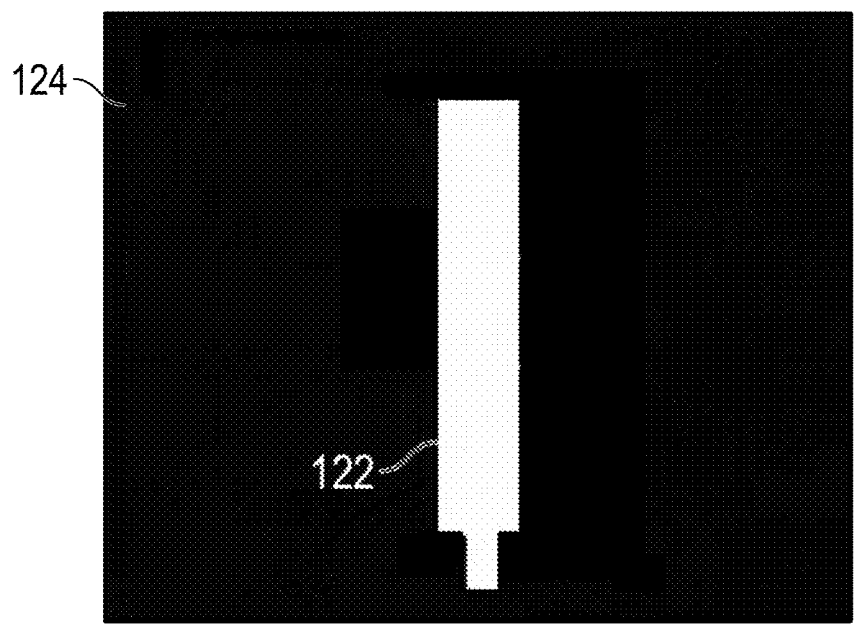

Embodiments also include a method of calibrating the imaging assembly 21 and the illuminator 28 to ensure proper alignment with respect to the stator stack 12 and/or rotary table 36. FIGS. 16A and 16B, and FIGS. 17A-F depict aspects of an example of the method. The method includes taking measurements of representative slots in at least two reference objects, where each reference object has a different dimension (e.g., thickness). In the method, two or more reference objects are imaged. For example, a first reference object is in the form of a relatively thin plate (e.g., steel plate) having a first thickness (e.g., 0.5 mm to 1 mm thick), and includes a first slot with known slot dimensions. A second reference object is in the form of a relatively thick plate or block (e.g., 100 mm thick) including a second slot having slot dimensions that are the same as or similar to the first slot. FIG. 16A depicts an example of a reference object 120 having a thickness in the z-axis direction of about 100 mm, and having a representative slot 122. FIG. 16B depicts an example of an image 124 of the slot 122.

The method includes a measurement process that includes taking one or more first images of the first reference object using the imaging inspection system 20, and performing a first measurement of one or more dimensions (e.g., width) of the first slot. One or more second images of the second reference object are taken and a second measurement of one or more dimensions of the second slot is performed. A difference between the first measurement and the actual dimensions of the first slot (i.e., a first difference) is determined and compared to a threshold difference value. A difference between the second measurement and the actual dimensions of the second slot (i.e., a second difference) is determined and compared to the threshold difference value.

For example, measurement of the dimensions includes extracting a plurality of edge points (e.g., 100 points) from an image and calculating average, maximum, and minimum widths. The threshold difference in this example is an error of about 1 to 2 percent of the actual slot widths.

If the first difference and the second difference is less than or equal to the threshold, the inspection system 20 is properly aligned.

If the difference is greater than the threshold, the inspection system 20 is not properly aligned. The imaging assembly 21 and/or the illuminator 28 may be adjusted and the imaging process is repeated. Adjustment and imaging as described herein may be iteratively performed until a proper alignment is reached.

In an embodiment, the calibration method includes acquiring a reference object such as the reference object 120, which has the stator slot 122 formed therein. The reference stator slot 122 has known dimensions and is known to be defect free.

An image of the reference slot 122 is taken by the imaging assembly 21, and the image is analyzed to identify opposing edges. Each edge corresponds to an image attribute gradient (i.e., a change in value of the image attribute along a selected direction). The gradients are compared, and if the difference between them is below a threshold difference, the imaging assembly and the illuminator 28 are considered to be properly aligned. If the difference is greater than the threshold difference, the imaging assembly orientation, the illuminator orientation, and/or the rotary table orientation are adjusted and the process is repeated until a proper or desired alignment is found.

FIGS. 17A-C represent an analysis of an image of a misaligned imaging assembly. FIG. 17A shows an acquired image 130. The image is analyzed along a search direction (line 132) to generate an edge map 134 and a line profile 136, representing a brightness or gray scale value of pixels in the image 130. As shown in FIG. 17C, there is a significant difference between peaks in the line profile 136, indicating misalignment.

FIGS. D-F represent an analysis of an image of a properly aligned imaging assembly. FIG. 17D shows an acquired image 170. The image is analyzed along a search direction (line 172) to generate an edge map 174 and a line profile 176. As In this example, as shown in FIG. 17F, the peaks represent a similar gradient, indicating proper alignment.

Figure 18:
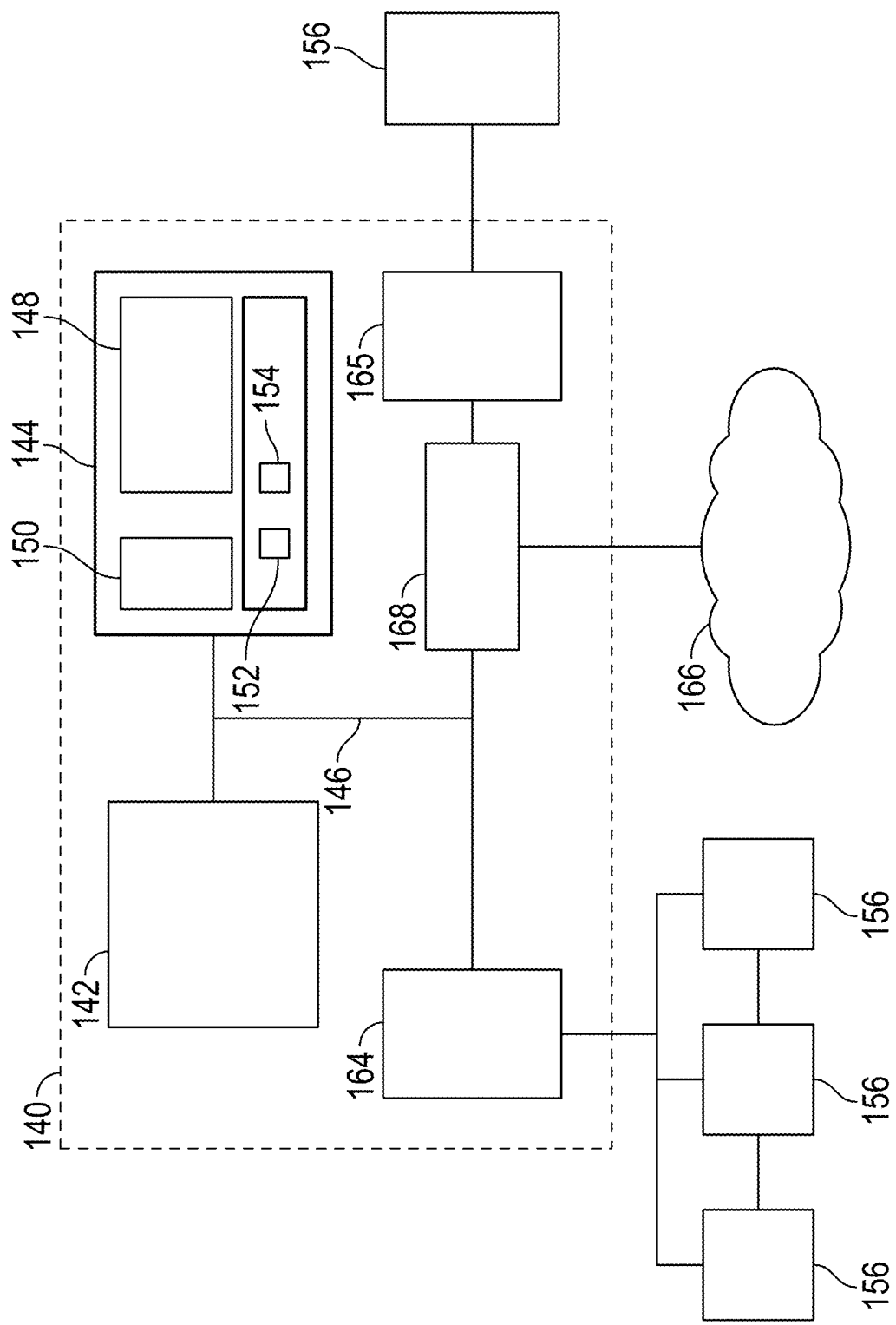
FIG. 18 depicts a computer system in accordance with an exemplary embodiment.

FIG. 18 illustrates aspects of an embodiment of a computer system 140 that can perform various aspects of embodiments described herein. The computer system 140 includes at least one processing device 142, which generally includes one or more processors for performing aspects of methods described herein.

Components of the computer system 140 include the processing device 142 (such as one or more processors or processing units), a memory 144, and a bus 146 that couples various system components including the system memory 144 to the processing device 142. The system memory 144 may include a variety of computer system readable media. Such media can be any available media that is accessible by the processing device 142, and includes both volatile and non-volatile media, and removable and non-removable media.

For example, the system memory 144 includes a non-volatile memory 148 such as a hard drive, and may also include a volatile memory 150, such as random access memory (RAM) and/or cache memory. The computer system 140 can further include other removable/non-removable, volatile/non-volatile computer system storage media.

The system memory 144 can include at least one program product having a set (e.g., at least one) of program modules that are configured to carry out functions of the embodiments described herein. For example, the system memory 144 stores various program modules that generally carry out the functions and/or methodologies of embodiments described herein. A module or modules 152 may be included to perform functions related to acquiring images and/or controlling scanning speed and operational parameters. An image analysis module 154 may be included for analysis of images as described herein. The system 140 is not so limited, as other modules may be included. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The processing device 142 can also communicate with one or more external devices 156 as a keyboard, a pointing device, and/or any devices (e.g., network card, modem, etc.) that enable the processing device 142 to communicate with one or more other computing devices. Communication with various devices can occur via Input/Output (I/O) interfaces 164 and 165.

The processing device 142 may also communicate with one or more networks 166 such as a local area network (LAN), a general wide area network (WAN), a bus network and/or a public network (e.g., the Internet) via a network adapter 168. It should be understood that although not shown, other hardware and/or software components may be used in conjunction with the computer system 140. Examples include, but are not limited to: microcode, device drivers, redundant processing units, external disk drive arrays, RAID systems, and data archival storage systems, etc.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A method of inspecting a stator stack, comprising:
disposing the stator stack on a support surface of an inspection system and locating a stator slot in a field of view of an imaging device, the imaging device configured to take images of a planar surface of the stator stack and the stator slot, the imaging device having an imaging axis that is aligned relative to the planar surface of the stator stack, the inspection system including the imaging device and a tilting system configured to control an orientation of the stator slot relative to the imaging axis;
performing a depth measurement of the stator slot, wherein the depth measurement includes rotating the stator slot along a first direction to a plurality of first orientations, taking a first image at each of the first orientations, and measuring a depth based on at least one of the first images;
performing a width measurement of the stator slot, wherein the width measurement includes rotating the stator slot along a second direction to a plurality of second orientations, taking a second image at each of the second orientations, and measuring a width based on at least one of the second images, wherein the first direction is perpendicular to the second direction, wherein rotating the stator slot includes tilting the planar surface of the stator stack; and
inspecting edges of the stator slot in the at least one of the first images to detect a potential deviation.

2. The method of claim 1, wherein the imaging device includes an optical camera and a telecentric lens, the camera configured to take images from a location above the stator slot, and an illumination device configured to apply the illumination from a location below the stator slot.

3. The method of claim 1, wherein the inspection system includes an illuminator configured to apply illumination through the stator slot, and performing the depth measurement includes analyzing each first image to determine an amount of illumination through the stator slot, selecting a first image having a greatest amount of illumination, and measuring the depth based on the selected first image.

4. The method of claim 1, wherein the inspection system includes an illuminator configured to apply illumination through the stator slot, and performing the width measurement includes analyzing each second image to determine an amount of illumination through the stator slot, selecting a second image having a greatest amount of illumination, and measuring the width based on the selected second image.

5. The method of claim 1, wherein the tilting system includes a pivot, a first lift platform and a second lift platform configured to be linearly moved in a direction that is normal to the support surface, the first lift platform is configured to tilt the stator stack along the first direction, and the second lift platform is configured to tilt the stator stack along the second direction.

6. The method of claim 5, wherein the tilting system includes a base structure supported by the pivot, the first lift platform and the second lift platform, the first lift platform and the second lift platform disposed orthogonally with respect to a location of the pivot.

7. The method of claim 6, wherein rotating the stator slot along the first direction includes incrementing the first lift platform when the second lift platform is at a default position, and rotating the stator slot along the second direction includes incrementing the second lift platform when the first lift platform is at a default position.

8. The method of claim 1, wherein the edges of the stator slot include a first long edge and a second long edge opposing the first long edge, and inspecting the edges includes:
constructing a first best fit line for the first long edge, comparing a first contour of the first long edge to the first best fit line, and identifying a deviation based on a first distance between the first best fit line and the first contour being greater than a selected first distance threshold; and
constructing a second best fit line for the second long edge, comparing a second contour of the second long edge to the second best fit line, and identifying a deviation based on a second distance between the second best fit line and the second contour being greater than the selected distance threshold.

9. A system for inspecting a stator stack, comprising:
an inspection system including an imaging device having an imaging axis that is aligned relative to a support surface, and a tilting system configured to control an orientation of the stator stack and a stator slot relative to the imaging axis; and
a processing device configured to control the imaging device to take images of a planar surface of the stator stack and the stator slot, when the stator stack is disposed on the support surface, the processing device configured to:
perform a depth measurement of the stator slot, wherein the depth measurement includes rotating the stator slot along a first direction to a plurality of first orientations, taking a first image at each of the first orientations, and measuring a depth based on at least one of the first images;
perform a width measurement of the stator slot, wherein the width measurement includes rotating the stator slot along a second direction to a plurality of second orientations, taking a second image at each of the second orientations, and measuring a width based on at least one of the second images, wherein the first direction is perpendicular to the second direction, and wherein rotating the stator slot includes tilting the planar surface of the stator stack; and
inspect edges of the stator slot in the at least one of the first images to detect a potential deviation.

10. The system of claim 9, wherein the inspection system includes an illuminator configured to apply illumination through the stator slot, and the processing device is configured to analyze each first image to determine an amount of illumination through the stator slot, select a first image having a greatest amount of illumination, and measure the depth based on the selected first image.

11. The system of claim 9, wherein the inspection system includes an illuminator configured to apply illumination through the stator slot, and the processing device is configured to analyze each second image to determine an amount of illumination through the stator slot, select a second image having a greatest amount of illumination, and measure the width based on the selected second image.

12. The system of claim 9, wherein the tilting system includes a pivot, a first lift platform and a second lift platform configured to be linearly moved in a direction that is normal to the support surface, the first lift platform is configured to tilt the stator stack along the first direction, and the second lift platform is configured to tilt the stator stack along the second direction.

13. The system of claim 12, wherein the tilting system includes a base structure supported by the pivot, the first lift platform and the second lift platform, the first lift platform and the second lift platform disposed orthogonally with respect to a location of the pivot.

14. The system of claim 13, wherein rotating the stator slot includes incrementing the first lift platform when the second lift platform is at a default position, and rotating the stator slot along the second direction includes incrementing the second lift platform when the first lift platform is at a default position.

15. The system of claim 9, wherein the edges of the stator slot include a first long edge and a second long edge opposing the first long edge, and the processing device is configured to:
construct a first best fit line for the first long edge, compare a first contour of the first long edge to the first best fit line, and identify a deviation based on a first distance between the first best fit line and the first contour being greater than a selected distance threshold; and
construct a second best fit line for the second long edge, compare a second contour of the second long edge to the second best fit line, and identify a deviation based on a second distance between the second best fit line and the second contour being greater than the selected distance threshold.

16. A non-transitory_computer program product comprising a computer-readable memory that has computer-executable instructions stored thereupon, the computer-executable instructions when executed by a processor cause the processor to perform operations comprising:
locating a stator slot of a stator stack in a field of view of an imaging device, the imaging device configured to take images of a planar surface of the stator stack and the stator slot, the imaging device having an imaging axis that is aligned relative to the planar surface of the stator stack, the stator stack disposed on a support surface of an inspection system, the inspection system including the imaging device and a tilting system configured to control an orientation of the stator slot relative to the imaging axis;
performing a depth measurement of the stator slot, wherein the depth measurement includes rotating the stator slot along a first direction to a plurality of first orientations, taking a first image at each of the first orientations, and measuring a depth based on at least one of the first images;
performing a width measurement of the stator slot, wherein the width measurement includes rotating the stator slot along a second direction to a plurality of second orientations, taking a second image at each of the second orientations, and measuring a width based on at least one of the second images, wherein the first direction is perpendicular to the second direction, and wherein rotating the stator slot includes tilting the planar surface of the stator stack; and
inspecting edges of the stator slot in the at least one of the first images to detect a potential deviation.

17. The computer program product of claim 16, wherein the inspection system includes an illuminator configured to apply illumination through the stator slot, and wherein:
performing the depth measurement includes analyzing each first image to determine an amount of illumination through the stator slot, selecting a first image having a greatest amount of illumination, and measuring the depth based on the selected first image; and performing the width measurement includes analyzing each second image to determine an amount of illumination through the stator slot, selecting a second image having a greatest amount of illumination, and measuring the width based on the selected second image.

18. The computer program product of claim 16, wherein the tilting system includes a pivot, a first lift platform and a second lift platform configured to be linearly moved in a direction that is normal to the support surface, the first lift platform is configured to tilt the stator stack along the first direction, and the second lift platform is configured to tilt the stator stack along the second direction.

19. The computer program product of claim 18, wherein the tilting system includes a base structure supported by the pivot, the first lift platform and the second lift platform, the first lift platform and the second lift platform disposed orthogonally with respect to a location of the pivot.

20. The computer program product of claim 19, wherein rotating the stator slot along the first direction includes incrementing the first lift platform when the second lift platform is at a default position, and rotating the stator slot along the second direction includes incrementing the second lift platform when the first lift platform is at a default position.

* * * * *